United States Patent [19]

Bitterli

[11] Patent Number: 5,893,567
[45] Date of Patent: Apr. 13, 1999

[54] SEALING SYSTEM FOR SEALING AN OPENING

[75] Inventor: Benno Bitterli, Spiegel, Switzerland

[73] Assignee: Anag A. Nussbaumer AG, Düdingen, Switzerland

[21] Appl. No.: 08/853,646

[22] Filed: May 9, 1997

[30] Foreign Application Priority Data

Mar. 11, 1997 [EP] European Pat. Off. .............. 97104035

[51] Int. Cl.⁶ ........................................................ F16J 15/48
[52] U.S. Cl. ......................... 277/646; 49/499.1; 220/234; 414/292
[58] Field of Search ......................... 277/646, 644, 277/637; 49/499.1, 489.1, 477.1; 138/93; 251/61.1; 414/292, 298; 220/232, 234, 203.25

[56] References Cited

U.S. PATENT DOCUMENTS

| 2,894,780 | 7/1959 | Hollander et al. ............... 277/646 X |
| 3,069,861 | 12/1962 | Berke et al. ..................... 49/499.1 X |
| 4,469,152 | 9/1984 | Hardee et al. ..................... 141/312 |
| 4,637,588 | 1/1987 | Wilhelm et al. ................. 138/93 X |
| 5,209,498 | 5/1993 | Colin .................................... 277/646 |
| 5,651,472 | 7/1997 | Semenenko ..................... 414/292 X |

FOREIGN PATENT DOCUMENTS

| 0114278 | 8/1984 | European Pat. Off. . |
| 0547861 | 6/1993 | European Pat. Off. . |
| 0680897 | 11/1995 | European Pat. Off. . |
| 295 03 812 U | 8/1995 | Germany . |
| 2291049 | 1/1996 | United Kingdom . |

OTHER PUBLICATIONS

"Schuettgutumschlag Ohen Dicke Luft Abgedichtete Verladegarnitur Verhindert Staubemissionen" Chemitechnik, vol. 23, No. 7, Jul. 1, 1994, pp. 16–17 XP 000454649, R. Muhr.

Primary Examiner—Anthony Knight
Assistant Examiner—Greg Binda
Attorney, Agent, or Firm—Martin A. Farber

[57] ABSTRACT

An intake/outtake arrangement of a container for a material may communicate with a tube, a transfer container or the like. In order to control intake or outtake of the material container, the intake/outtake arrangement is movable relative to wall means of the container between an open position and a closed position whereby an intake/outtake opening is opened and closed. A sealing body is located between the material container and the intake/outtake arrangement, and is elastically deformable. The sealing body has an inner cavity to be connected to a source of fluid. When in communication with the source of fluid, the sealing body expands in outward direction while being supported by a rigid inner wall.

12 Claims, 2 Drawing Sheets

SEALING SYSTEM FOR SEALING AN OPENING

FIELD OF THE INVENTION

This invention relates to a sealing system for the intake or outtake of a container or the like where an intake or outtake arrangement is movable relative to the container between an open position and a closed position, and to which a tubular conduit or an intermediate container or the like, may be connected so that this arrangement constitutes an outtake arrangement of the first container but is an intake arrangement to the second container. In general, the second or intermediate container (or a tubular conduit) is used to transport sensitive or hazardous material in a safe manner, the sealing system preventing the escape of the material or its contact with the environment when being unloaded.

BACKGROUND OF THE INVENTION

With structural parts or bodies that are movable relative to each other, sealing is quite difficult, because sealings of ordinary type, being more or less elastic and having a given shape, wear easily out when the parts are moved. In other applications, e.g. for tube switches, expandable sealings have been suggested which are inflated only if the respective body is motionless and is to be sealed. Such sealings engage, in general, a flat surface which does not cause any problem. An example of an inflatable sealing which engages a flat surface is disclosed in EP-B-0 114 278.

More difficult is it, however, if rounded parts, for example a connected container or a shutter valve and to be sealed. This is why an inflatable sealing has not become known for such applications.

An inflatable sealing ring can be fastened to the respective radially outer part so as to be pressed by pressurized air against a radially inner part. This involves an advantageous possibility of supply of pressurized air from the exterior. However, it has been found that the service life of such sealings is relatively short so that they are not distinguished from non-inflatable elastic sealings of a substantially given shape in this respect. It is clear that this is one reason why this suggestion has not been used any further.

SUMMARY OF THE INVENTION

Therefore, it is an object of the present invention to provide an efficient sealing having a longer service life in a system of the above-mentioned type.

Surprisingly, this object is achieved by providing a source of fluid for introducing fluid, particularly a pneumatic fluid, such as air, into an inner cavity of a sealing body that is elastically deformable so as to expand in an outward direction while being supported by an inner wall of the container.

It is surprising that by a simple reversion of the known arrangement or support of the inflatable sealing ring, in comparison with the older suggestion, not only an increase of service life could be attained, but also a significant improvement of the sealing effect. Investigations of the inventor have shown that the arrangement according to the older suggestion is delicate in that there is an optimal operational pressure, and that the properties of the sealing are significantly impaired when this optimal pressure is either exceeded or falls below.

When further investigating this phenomenon, it has been found that with too low a pressure, sealing would not be provided for understandable reasons, while with too high a pressure the sealing ring and inflated in such a manner that it engages the inner wall of the respective other body (which forms part of the container) forming folds and, thus, cannot fulfill its sealing function in a satisfactory manner. Only with the above-mentioned sealing system according to the invention the problem can be avoided in a favorable way, thus, achieving the object which forms the base of the present invention.

It is clear, although a sealing ring would be preferred, that the sealing body may have various configurations. For example, the sealing body can be formed by a series of circumferentially arranged individual bulges.

In a preferred embodiment of the present invention, the container may be a vessel for bulk material (although the invention could also be applied to liquid material) and can have a funnel that forms part of the outtake arrangement, and is particularly adapted to be coupled to a discharge tube or intermediate container. In such an embodiment, the inner wall is in the form of a valve cone and the sealing body expands to engage an outer wall formed by the funnel.

According to an especially advantageous alternate embodiment of the invention, the outer wall comprises a clearance situated radially outwards the sealing body for receiving it in its expanded condition. The clearance may be in the form of a recess or annular groove, thus increasing the sealing surfaces of mutual engagement with the sealing body.

Preferably, however, the clearance is slot-shaped to enable penetration of the sealing body, in particular, so as to engage a further wall situated outside said outer wall. This outermost wall will, ordinarily, be the wall of a tube conduit or intermediate container coupled to the afore-said container. In, this way a multiple effect of the sealing system according to the invention is obtained which includes also a certain locking effect. This is due to the fact that the sealing body will form a bulge which engages a substantially horizontal lower surface of the outer wall.

When the outer wall comprises an outer surface for engaging coupling means of take-up means for the material, such as the above-mentioned intermediate container, it is preferred if the outer surface is converging toward said outtake opening and with respect to the axis of the container. In this way, the construction is simplified, on the one hand, while coupling and sealing is enhanced, on the other hand.

In general, and as has already been mentioned, it is advantageous if the sealing body, in its expanded condition, forms a bulge which engages at least two surfaces of said outer wall, said surfaces forming an angle with each other.

In order to further improve the sealing effect it is favorable if the sealing body comprises a radial outer prolongation extending in upward direction for providing a larger area of sealing engagement. This prolongation may also be inflatable, if desired, either separately or while being in communication with the cavity of the sealing body. In such a case, it is preferable if the inner wall forms an annular clearance or groove to receive and hold the prolongation.

When the outtake arrangement comprises a valve cone, it is convenient if its cone periphery forms a fastening means for said prolongation either by having a holding device, such as clamps, attached, or by allowing the cone simply to protrude over a surface of the prolongation. In this way, a positive holding connection is achieved in a simple manner.

As has been discussed above, a crucial point in the known arrangements was the supply of pressurized air. In order to supply fluid or pressurized air to the cavity of the sealing body in a constructively simple way, it is preferred if the outtake arrangement itself includes a conduit in communication with the inner cavity of the sealing body. This conduit may, according to a special embodiment, at least in part be provided as a cavity of the valve cone.

The conduit may, however, also comprise at least one radial channel for distribution and supply of the fluid. This channel may comprise a downwards directed portion or section, so that fluid supply is effected from the inner side (where it can be protected against the material to be handled) to the outer side. As an alternative, the closure member, particularly the valve cone, may form at least one supply cavity which is easier to construct.

It is advantageous if control means are provided operated synchronously with the actuation of the valve cone either by providing common actuating means or by providing a sensor, such as a feeling pin, for the relative position of the valve and the outer wall.

BRIEF DESCRIPTION OF THE DRAWINGS

Further details of the invention will become apparent from the following description of an embodiment schematically illustrated in the drawings in which.

DETAILED DESCRIPTION OF THE DRAWINGS

Figure 1:
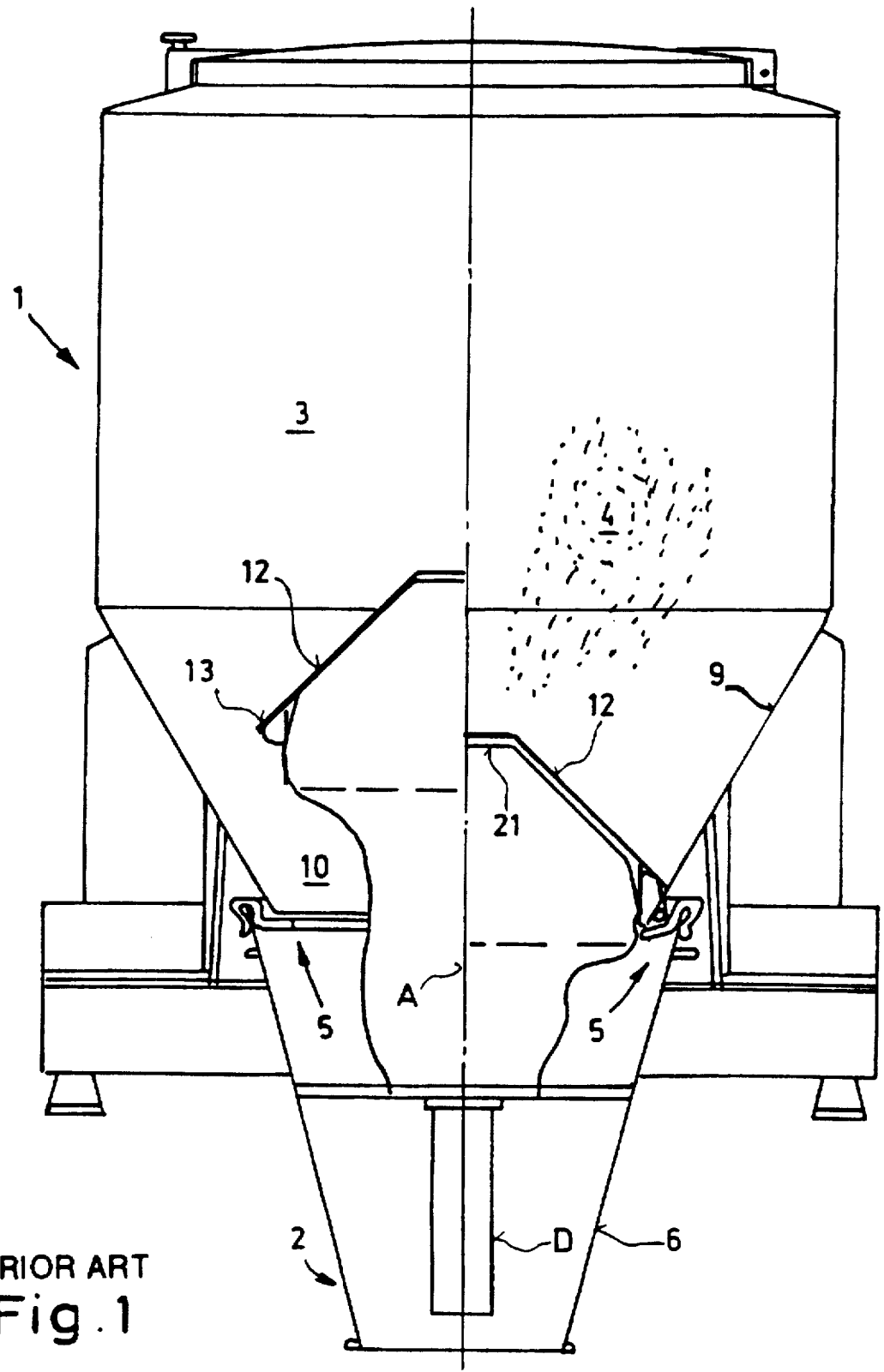
FIG. 1 shows a prior art container where the present invention shall be applied.

FIG. 1 shows a container 1 comprising an inner space 3 for receiving friable bulk material 4, a discharge funnel 9 and an outtake arrangement generally designated 2 and connected to a discharge portion 10 of the container 1. The outtake arrangement 2 comprises a discharge portion 6, but could also be formed by a tubular conduit or, preferably, by a (smaller) intermediate container of the outer shape represented in FIG. 1 and coupled to the bin-like container 1.

In order to close the discharge portion 10 towards the outtake arrangement 2, a valve cone 12 is provided along an axis A of the container 1 which co-operates with the lower portion of the discharge funnel 9, and which may be displaced from a closed position shown at the right side of FIG. 1 into an open position shown at the left side of FIG. 1 by means of a fluidic drive D, such as a pneumatic cylinder. This valve cone 12, upon opening (left-side of FIG. 1), leaves a ring-slot between its lower edge 13 and the wall of the discharge funnel 9 through which the material 4, for example a powdery one, may flow out.

In the prior art embodiment, an arrangement 5 of sealing rings of a given, though elastically deformable, shape is provided for establishing a sealing between the discharge portion 6 (which may be coupled to the discharge funnel 9, thus being movable relative to the same) and/or the discharge funnel 9 and the relatively movable lower edge 13 of valve cone 12. As mentioned above, such a known sealing system 5 will be subjected to extensive wear, not least also under the influence of powdery material 4 which may frequently be of abrasive nature so that the sealing function is incomplete and not reliable.

Figure 2:
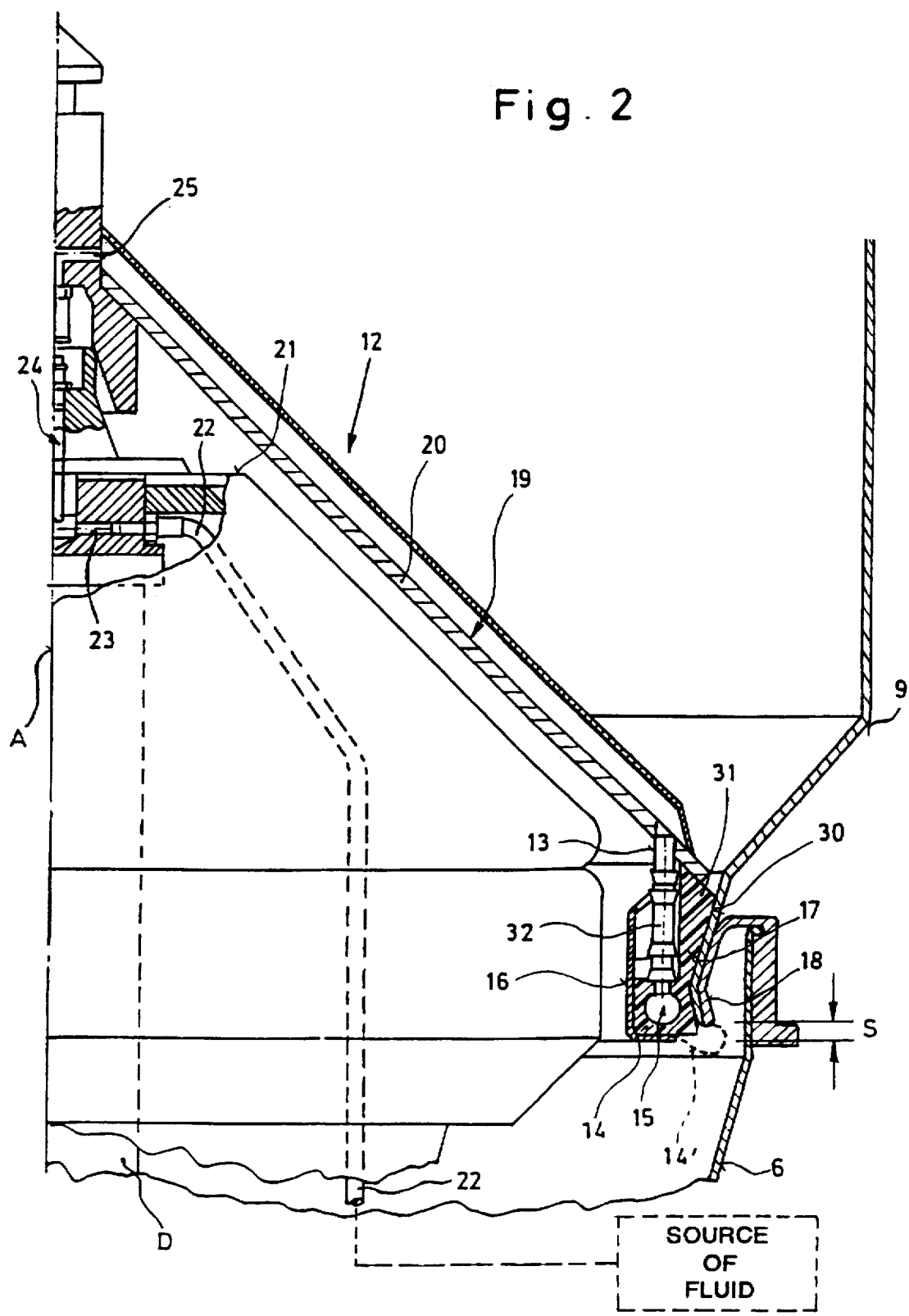
FIG. 2 the sealing region comprising the sealing system according to the present invention in a larger scale.

As shown in FIG. 2, an inflatable sealing in form of a sealing ring 14 in accordance with the invention comprises a cavity 15 connected to a source of a fluid, particularly to a source of pressurized air, and is arranged in such a way that an inner wall 16 of the sealing ring 14 is supported by a rigid inner wall 16 of one of the parts which are movable relative to each other, e.g. of the valve cone 12, but has a clearance in radial outward direction, which in this embodiment is in the form of an annular slot S. When expanding due to inflation by the fluid, the sealing ring 14 will engage at least one radially outer wall 17 of at least one other part relatively movable with respect to the valve cone 12. This outer wall 17 is formed by the lower surface and/or the edge of the discharge funnel 9.

It has been mentioned that also parts 6 and 9 are movable relative to each other, and it will be understood that the invention can also be applied to seal only these two parts against each other. It will also be understood that the clearance S does not need to extend parallel to the axis A, but it would also be possible that the outer wall 17 faces simply the inner wall 16 and the inflatable sealing ring 14. However, by the embodiment shown, the sealing ring 14 attains a double sealing effect, thus substantially simplifying and improving the design in constructive respect.

In accordance with a preferred embodiment, this is achieved in such a way that the outer surface of the outer wall 17 serves at the same time as an engagement surface for the discharge portion 6 which, in turn, engages the outer surface of the outer wall 17 by a beaded propping wall 18. In inflated or expanded condition of the sealing ring 14, as shown in FIG. 2 in dotted lines, a bulge 14' of this ring 14 displaces into the slot S where it engages not only the lower outer wall 17 of the funnel 9, but also its transverse, substantially horizontal edge surface and beyond the wall 17 up to the lower edge of the propping wall 18. Thus, the sealing ring 14 seals all parts which are movable relative to the outer wall 17, i.e. the cone 12 and the inner wall 16, on the one hand, and the discharge portion 6 and the propping wall 18, on the other hand. In addition, the discharge portion 6 is locked against any displacement in axial direction, as the valve cone 12 is locked against such movement in the same way.

In that the sealing ring 14 is rigidly supported by the inner wall 16, its sealing function at this location can never be questioned by any movement while expanding. A movement of the sealing ring 14 and its bulge 14' occurs only in radial outward direction. Expanding of the ring 14 due to the inner pressure introduced into the cavity 15 provides for a smooth engagement of the walls 17 and 18 free of folds.

In order to attain the objective of double sealing, i.e. of sealing the valve cone 12 against the inner surface of outer wall 17 or of funnel 9, and of the outer surface of outer wall 17 and the propping wall 18, it is advantageous if the sealing ring 14 has a prolongation 31 forming a sealing surface 30. This prolongation too could be embodied as an inflatable sealing ring which could simply be done either by providing a branch connection to a supply pipe in communication with the channel 19, or by providing a cavity within the prolongation 31 which is in communication with the cavity 15. Also in this case, an inflatable sealing ring would be obtained which has an inner cavity and which is supported by the rigid outer wall of the supply pipe 32 (or any other radially inner wall). This sealing ring, according to the general teaching of this invention, would have enough space towards the radially outer wall 17 to allow it to expand. As far as the term "radial" inner or outer wall is used in this specification, it refers to the axis A of outtake arrangement 2 and discharge portion 10.

It would be conceivable within the scope of the invention, to form the prolongation 31 and the sealing ring 14 as separate parts and make one or both of them inflatable in radial direction. It will, however, be clear that manufacture and mounting is facilitated and accuracy of fit is improved by an integral construction of this sealing body. The radially outer wall 17 may have another cross-sectional configuration than the one shown as a conical wall, for example having an annular groove or indentation for receiving the expanded sealing element 31; a conical configuration, as shown, is, however, preferred also within the region of the radially acting sealing ring 14. It is also preferred, if the periphery of the valve cone 12 is used to fasten the sealing element 31 in a positive manner.

One problem which heretofore deterred from using such sealing rings 14 which are inflatable in radial direction was the question of supply of pressure medium. For, of course, this problem can easier be solved if the sealing ring 14, for example in the sense of FIG. 1, would be supported by the radially outer wall of the discharge funnel 9 where one has more constructional freedom to mount a supply line for the pressure medium.

This problem is solved within the scope of the present invention by communicating the valve cone 12 with a supply conduit 19, for example by providing the cone 12 with an inner wall 20. This approach is of particular advantage in the context of the pneumatic drive D (FIG. 1), because in this way pressurized air can easily be supplied from the region of the axis A, e.g. out of or parallel to the drive unit D, into a supply channel 19 and, thus, into the cavity 15.

In the embodiment shown, a parallel conduit or hose 22 is provided, the upper end of which being attached to a fastening and actuation cone 21 for mounting and actuating the valve cone 12 in such a manner that air delivered by it is blown into the supply channel 19 via a transverse channel 23 and a central channel 24, and from there through a further transverse channel 25. The supply channel 19 may be a single ring cone-shaped cavity of the valve cone 12 or may be formed by one or more individual conduits leading radially outwards and downwards.

Control of air supply can easily be synchronized with the actuation of the valve cone 12 due to the vicinity and/or connection to the drive D and the actuation cone 21 so that air is blown into the cavity 15 only when the valve cone 12 is in its lower or closed position (cf. the right-hand position in FIG. 1). Optionally, a sensor, e.g. in the form of a feeling pin (retractable by the lowering valve cone against the pressure of a spring to close or open a switch), is provided in order to monitor engagement of the discharge portion or of the beaded propping wall 18 and the outer wall 17 in order to allow only then blowing of pressurized air into the cavity 15.

Although the present invention has been described with reference to a container of the type according to FIG. 1 where the axes A of the container 1 and of the discharge parts 2 and 10 coincide, it will be understood that the invention is not limited to such a configuration. It could equally be applied to containers having at least two, e.g. teat-like, discharge openings, the axes of which needing not necessarily be parallel to the axis of the container. It will also be understood that the invention has been described with reference to an outtake arrangement (which is preferred due to the more essential problems existing there), but that it can also be used in connection with an intake arrangement, especially since it has already been stated that the discharge funnel 9 could be formed by an intermediate container for which the arrangement 2 shown and described constitutes an intake arrangement.

Furthermore, although the present invention has been described with reference to a container closure member in the form of a valve cone 12 that is movable up and down in vertical direction, in a similar way closure members could be used which are rotating or pivoting about a horizontal or a vertical axis, as known to those skilled in the art. In such a case, a shaft, for example, particularly a vertical shaft, could be hollow and could be used as a supply conduit for a pressure medium, such as pressurized air, instead of the hose 22.

The drive for the closure member need not be formed by a cylinder D, although it has the advantages discussed above. An alternative could be a rotating motor for rotating the above-mentioned shafts, the motor being a fluidic motor, if desired, such as a pneumatic motor. In the case of an electric motor, a reduction gear could be coupled to the aforesaid closure shaft and/or a stepup gearing could be provided for driving a fan or a pump for the pressurized fluid to be supplied to the sealing(s) 14 and/or 31. Rotating motors, however, must not be aligned with the axis A of the closure member, but could also have a horizontal motor shaft, especially in the case of a hollow shaft for air supply or with a lateral arrangement of the motor outside the container 1.

It will also be understood that an inflatable sealing could also be provided between the outer surface of wall 17 and the radially outer and inner surface of the discharge portion 6 (surface 18) to cooperate with the latter. In such a case, the supply conduit could be provided outside the container 1.

What is claimed is:

1. A sealing system for sealing an opening provided in wall means forming a container along an axis for receiving material, the container including an intake/outtake arrangement movable relative to said wall means between an open position and a closed position wherein an intake/outtake opening is opened and closed, said wall means including an inner wall, said sealing system comprising:

a sealing body located between said container and said intake/outtake arrangement, said sealing body being elastically deformable and having an inner cavity to be connected to a source of fluid so as to expand said sealing body in outward direction while being supported by said inner wall; and wherein said wall means further comprise an outer wall movable relative to said inner wall, said sealing body expanding to engage said outer wall said outer wall comprises a clearance situated radially outwards of said sealing body for receiving said sealing body in its expanded condition; said clearance is slot-shaped to enable penetration of said sealing body so as to engage a further wall situated outside said outer wall.

2. Sealing system as claimed in claim 1, wherein said inner wall is in the form of a valve cone and said sealing body expands to engage said outer wall which is in the form of funnel forming said intake/outtake arrangement.

3. Sealing system as claimed in claim 1, wherein said outer wall comprises an outer surface for engaging coupling means of take-up means for said material.

4. Sealing system as claimed in claim 3, wherein said outer surface is converging toward said intake/outtake opening and with respect to said axis.

5. A sealing system for sealing an opening provided in wall means forming a container along an axis for receiving material, the container including an intake/outtake arrangement movable relative to said wall means between an open position and a closed position wherein an intake/outtake opening is opened and closed, said wall means including an inner wall, said sealing system comprising:

a sealing body located between said container and said intake/outtake arrangement, said sealing body being elastically deformable and having an inner cavity to be connected to a source of fluid so as to expand said sealing body in outward direction while being supported by said inner wall; and wherein said sealing body in expanded condition forms a bulge which engages at least two surfaces of an outer wall of said wall means, said surfaces forming an angle with each other.

6. Sealing system as claimed in claim 5, wherein one of said surfaces of said outer wall extends in a mainly horizontal direction, in expanded condition of said sealing body said bulge protruding beyond said mainly horizontal surface to engage a further surface.

7. A sealing system for sealing an opening provided in wall means forming a container along an axis for receiving material, the container including an intake/outtake arrangement movable relative to said wall means between an open position and a closed position wherein an intake/outtake opening is opened and closed, said wall means including an inner wall, said sealing system comprising:

- a sealing body located between said container and said intake/outtake arrangement, said sealing body being elastically deformable and having an inner cavity to be connected to a source of fluid so as to expand said sealing body in outward direction while being supported by said inner wall;
- said sealing body comprises a radial outer prolongation extending in an upward direction for providing a larger area of sealing engagement; and
- wherein said inner wall is in the form of a valve cone comprising a cone periphery which forms a fastening means for said prolongation.

8. A sealing system for sealing an opening provided in wall means forming a container along an axis for receiving material, the container including an intake/outtake arrangement movable relative to said wall means between an open position and a closed position wherein an intake/outtake opening is opened and closed, said wall means including an inner wall, said sealing system comprising:

- a sealing body located between said container and said intake/outtake arrangement, said sealing body being elastically deformable and having an inner cavity to be connected to a source of fluid so as to expand said sealing body in outward-direction while being supported by said inner wall;
- said sealing body comprises a radial outer prolongation extending in an upward direction for providing a larger area of sealing engagement;
- said inner wall is in the form of a valve cone comprising a cone periphery which forms a fastening means for said prolongation; and wherein said cone periphery protrudes over a surface of said prolongation to form said fastening means.

9. A sealing system for sealing an opening provided in wall means forming a container along an axis for receiving material, the container including an intake/outtake arrangement movable relative to said wall means between an open position and a closed position wherein an intake/outtake opening is opened and closed, said inner wall means including an inner wall, said sealing system comprising:

- a sealing body located between said container and said intake/outtake arrangement, said sealing body being elastically deformable and having an inner cavity to be connected to a source of fluid so as to expand said sealing body in outward direction while being supported by said inner wall;
- said outtake arrangement includes means forming a conduit in communication with said inner cavity of said sealing body; and wherein
- said inner wall is in the form of a valve cone and said means forming a conduit are provided as a cavity of said cone.

10. Sealing system as claimed in claim 9, wherein said cavity of said cone is formed as a single ring-conical cavity.

11. A sealing system for sealing an opening provided in wall means forming a container along an axis for receiving material, the container including an intake/outtake arrangement movable relative to said wall means between an open position and a closed position wherein an intake/outtake opening is opened and closed, said wall means including an inner wall, said sealing system comprising:

- a sealing body located between said container and said intake/outtake arrangement, said sealing body being elastically deformable and having an inner cavity to be connected to a source of fluid so as to expand said sealing body in outward direction while being supported by said inner wall;
- wherein said wall means further comprise an outer wall movable relative to said inner wall, said sealing body expanding to engage said outer wall;
- said outer wall comprises a clearance situated radially outwards of said sealing body for receiving said sealing body in its expanded condition; and
- wherein said outer wall comprises an outer surface for engaging coupling means of take-up means for said material.

12. Sealing system as claimed in claim 11, wherein said sealing body comprises a radial outer prolongation extending in an upward direction for providing a larger area of sealing engagement.

* * * * *